United States Patent [19]

Selby et al.

[11] 3,909,689
[45] Sept. 30, 1975

[54] ELECTRICALLY POWERED SELF-PROPELLED WHEELCHAIR AND CONTROL UNIT

[75] Inventors: James L. Selby, Grandview, Mo.; James N. Shirley, Kansas City, Kans.

[73] Assignee: Top Quality Tool & Machine Co., Inc., Grandview, Mo.

[22] Filed: Jan. 2, 1974

[21] Appl. No.: 429,564

[52] U.S. Cl. ................................. 318/257
[51] Int. Cl.² ............................ H02P 7/28
[58] Field of Search .......... 318/139, 256, 257, 280, 318/341, 599

[56] References Cited
UNITED STATES PATENTS
3,564,366  2/1971  Worrell ........................ 318/257
3,764,870  10/1973  Morton et al. ................ 318/139

*Primary Examiner*—Robert K. Schaefer
*Assistant Examiner*—W. E. Duncanson, Jr.
*Attorney, Agent, or Firm*—Lowe, Kokjer, Kircher

[57] ABSTRACT

A battery-powered, self-propelled electric wheelchair includes unique control circuitry. Thrust is provided to propel the wheelchair by a chain drive assembly linked to a permanent magnet, low RPM motor, thereby avoiding the necessity of complex and inefficient reducing gears. The controlling circuit maintains a high degree of electric efficiency by supplying the motor with a pulse width modulated voltage supply throughout most of its useable speed range. When higher speeds are desired, or where the work potential must otherwise be maximized, an automatic bypass relay couples the battery directly to the motor thereby bypassing the control circuitry and avoiding transistor power losses. The control system incorporates a lock out switch which prevents the operator from changing the direction of travel when voltage is supplied to the drive motor, thereby preventing "jackrabbit starts" or possible tipping of the unit due to excess acceleration. Unit control, steering and braking are accomplished by a single control handle that also supports a lever for actuating drum brakes. A built-in battery charger features an automatic charge rate control and a battery condition indicator light.

6 Claims, 5 Drawing Figures

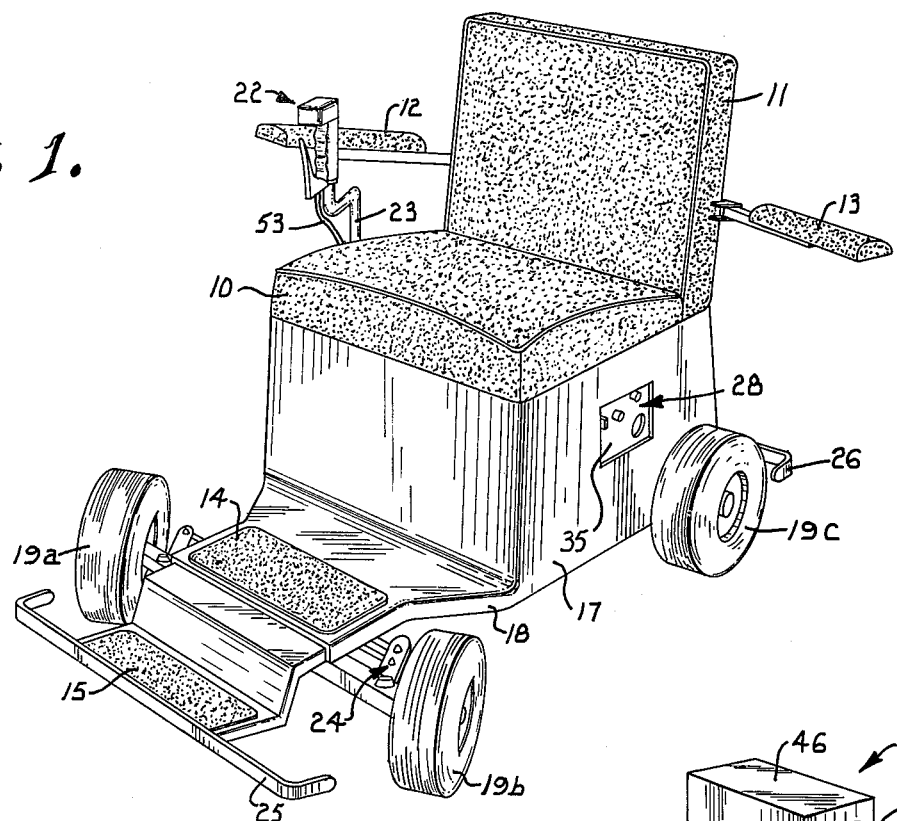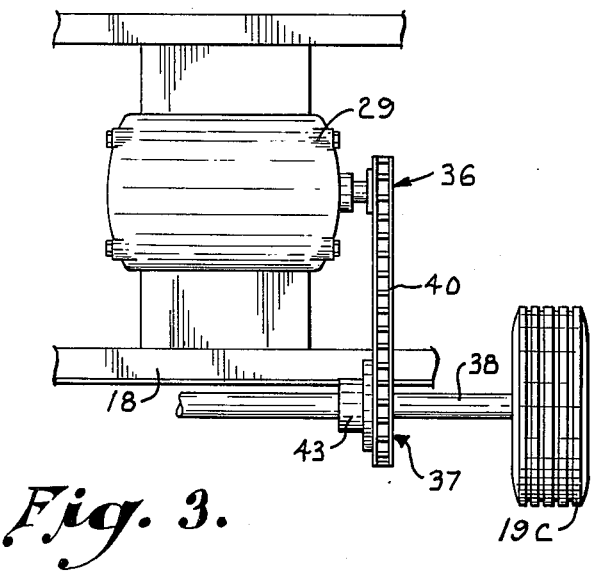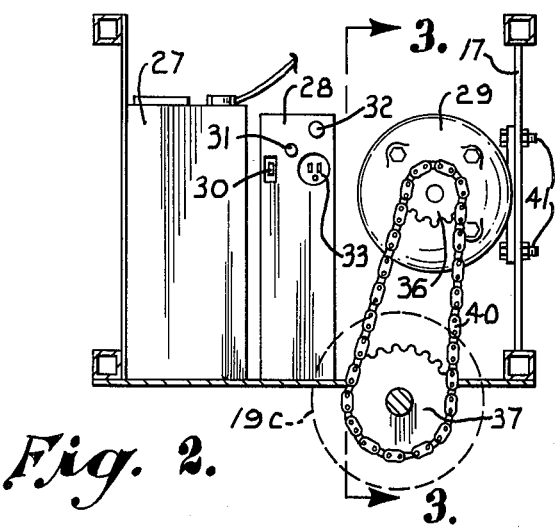

ELECTRICALLY POWERED SELF-PROPELLED WHEELCHAIR AND CONTROL UNIT

BACKGROUND AND SUMMARY OF THE INVENTION

This invention relates to motor driven wheelchairs for invalids, and more particularly to an improved means of electrical motor control.

Electrically powered motor driven wheelchairs offer significant and obvious advantages to a handicapped person. Numerous electric wheelchair designs and structural variations have appeared in the prior art, but these designs have suffered from various problems and weaknesses or combinations thereof which the subject invention has been designed to avoid.

The speed control means utilized by many prior art devices include a resistance network which is varied by the user in accordance with the desired vehicle speed. However, such a speed control system is notoriously inefficient and unreliable. More sophisticated devices have since incorporated pulse width or pulse frequency modulation schemes wherein the motor is driven by pulses, and the resultant motor speed, which is proportional to the average DC voltage of the pulse supply waveform, will be infinitely variable. The latter system is extremely efficient at low or moderate speeds, but at high speeds or where full power is otherwise desired, power transistor losses will necessitate a control circuit bypass means whereby the battery may be connected directly to the motor. It is a primary object of this invention to provide a controller bypass system which engages smoothly and automatically when maximum power is desired, as when a curb or other terrain obstacles must be overcome. It is a feature of this object that the unique system will automatically engage when the user requires 90 percent of available power, thus achieving maximum efficiency.

It is a further object of the subject invention to provide a "lock out" circuit which automatically prevents the user from changing from forward to reverse gear or vice versa when energy is being supplied to the drive motor. This will prevent mechanical damage to the motor which might otherwise occur and it will promote operator safety. When the wheelchair is used indoors, this feature will reduce skid marks on hard surface floors and prevent bunching or puckering of carpeting.

Another object of this invention is to provide a simple and efficient motor drive system for a wheelchair which eliminates the need for complex reducing gears or multiple drive belts. Prior art devices generally employ high speed electric motors, and consequently need complex reducing gear systems. The inevitable leaking of gearbox grease makes such devices particularly ill suited for indoor use. When Vee-belts are employed, inefficiency and unreliability are further encountered. The subject invention employs a low speed motor and complex reducing gears are thereby eliminated. A sprocket and chain system efficiently couples the motor to the rear drive wheels, and the use of grease filled gear boxes is avoided. The instant device requires no latches, clutches or exterior belts. It is easily actuated by a single hand-operated control box which necessitates only a minimum of physical work by the operator.

Other and further objects of the invention, together with the features of novelty appurtenant thereto, will appear in the course of the following description.

DETAILED DESCRIPTION OF THE INVENTION

In the accompanying drawings which form a part of the specification and are to be read in conjunction therewith, and in which like reference numerals are employed to indicate like parts in the various views:

FIG. 1 is a perspective view of the electric wheelchair constructed in accordance with the subject disclosure;

FIG. 2 is a sectional side view of the wheelchair shown in FIG. 1 with the rear drive wheels omitted;

FIG. 3 is a side elevational view of the motor and power train, taken along line 3—3 in FIG. 2 in the direction of the arrows;

FIG. 4 is a perspective view of the unit control handle; and

Figure 5:
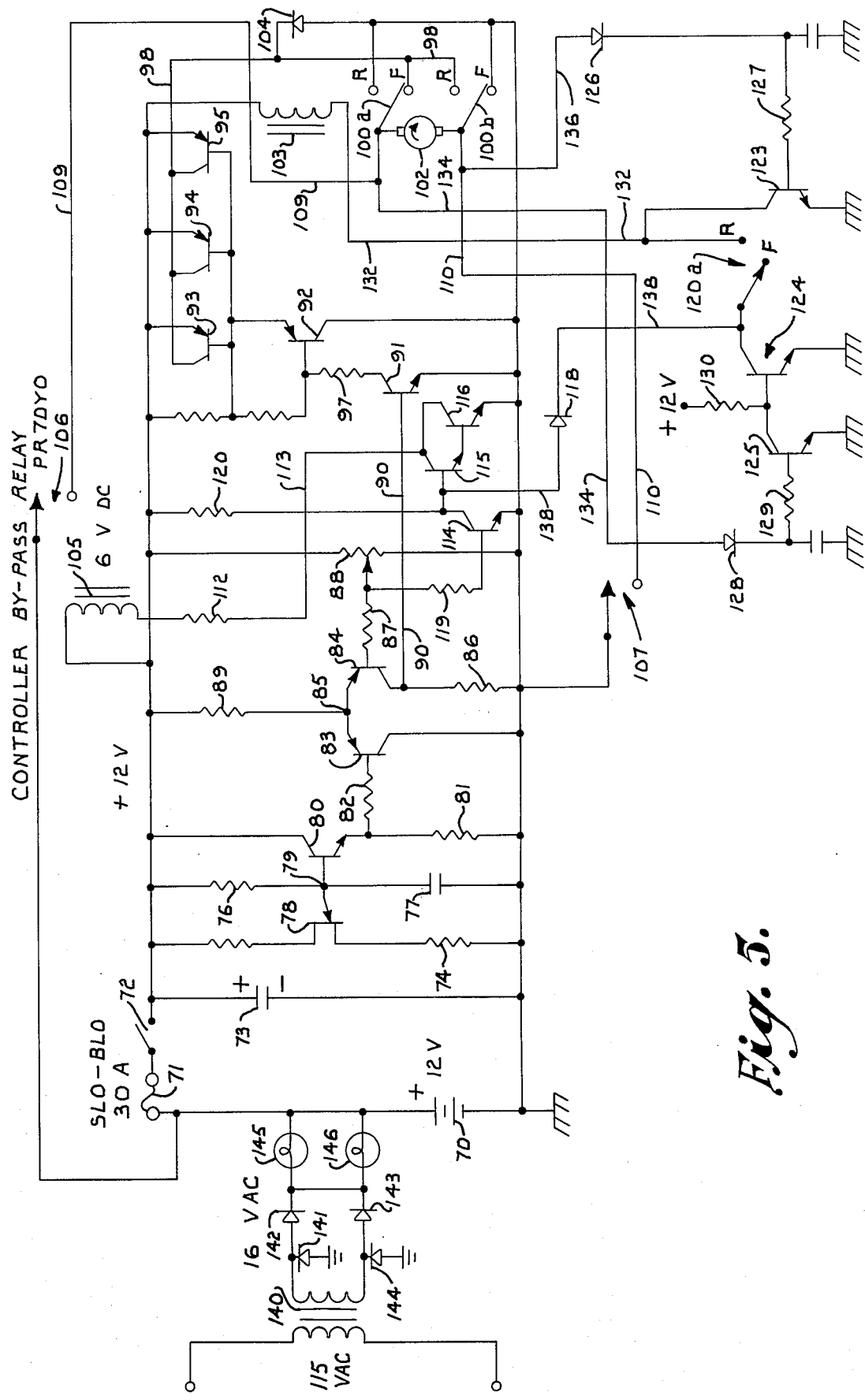
FIG. 5 is a schematic diagram of the power control unit for the wheelchair motor.

With reference to FIG. 1, there is shown a wheelchair having a removable seat 10, a back 11, adjustable armrests 12 and 13 and footrests 14 and 15. The seat 10 is disposed on a generally box-like base portion 17 which is fixedly attached to the unit frame 18. Four similar wheels 19 provide maximum stability.

Control handle 22 is mounted on linkage 23 which, when laterally pivoted by the operation, effects unit steering and the adjustable positioning of front wheels 19 by actuation of a conventional steering assembly 24. Should the wheelchair experience an inadvertent collision, front bumper 25 will reduce the probability of steering linkage damage. Likewise, rear bumper 26 similarly guards the rear drive wheels.

Disposed interiorly of the box-like portion 17 of the wheelchair is a battery 27, pulse width modulated vehicle control unit 28, and motor 29 (FIG. 2). The control unit 28 (see FIG. 2) has an on-off switch 30 and a fuse holder 32 mounted thereon adjacent to a bulb receptacle 31 and female power plug 33, which are utilized in conjunction with a battery recharging circuit discussed later. As also seen in FIG. 1, these components are accessible exteriorly of base portion 17 due to the presence of a generally rectangular cut away portion 35 which has been provided therein.

With reference to FIGS. 2 and 3, a chain drive sprocket 36 on motor 29 is linked to drive shaft sprocket 37 by chain 40. Motor 29 is securedly affixed to the rear of base portion 17 by bolts 41. Rear axle 38 extends through bearing 43 which is rigidly attached to frame 18.

In FIG. 4 the operator control handle, generally depicted by reference numeral 22, is shown. Mounted on linkage 23 is a handle grip portion 45 with an attached control box 46 mounted thereon. The control box contains a forward-reverse switch 48 and a spring loaded adjustable speed control push button 50. When the operator grips handle grip 45, vehicle speed and direction may be conveniently adjusted by the use of a thumb. Lever 52, which is attached to linkage 23 by bracket 51, operates drum brakes (not shown) via brake linkage 53.

The electronic control circuitry, shown in FIG. 5, produces a pulse width modulated waveform which drives the motor. Direct current is supplied to the circuit by battery 70, which in the preferred embodiment is a 12 volt unit. A slow blow fuse 71 is provided to protect the control circuitry if accidental electrical shorts should occur. The "slow blow" fuse will allow heavy starting currents, approximately equal to twice the rate fuse value, to be delivered to the motor for approximately two minutes, enabling the unit to overcome starting resistance without experiencing inadvertent fuse blowout. The unit is started by engaging switch 72 located within control box 46 on hand lever 52 (FIG. 4). Capacitor 73 provides a limited degree of voltage regulation.

Unijunction transistor 78 and associated components comprise a relaxation oscillator which generates an approximate sawtooth output. Capacitor 77 is charged via resistor 76, and when a suitable voltage is reached transistor 78 will turn on, discharging capacitor 77 through the emitter of transistor 78 and resistor 74. When capacitor 77 is sufficiently discharged, transistor 78 will turn off and capacitor 77 will recharge, causing the cycle to be repeated. (The voltage drop across R-76 is too large to bias the transistor through this resistor so that the device will not stay in the "on" state).

The sawtooth waveform appearing at node 79 is directly coupled to the base of transistor 80, which appears in an emitter-follower configuration. The inverted output across resistor 81 is delivered via resistor 82 to the base of transistor 83, thereby driving same. The sawtooth output of the transistor 83 (part of the differential pair including transistor 84) is developed across emitter-resistor 89 and appears at node 85.

The base of transistor 84 is coupled via resistor 87 to the adjustable contact arm on variable resistor 88, which is the unit speed control. A variable DC voltage, proportional to the user's desired speed, is fed to transistor 84. At the same time the voltage appearing at node 85, where the emitters of transistors 83 and 84 are joined with emitter-resistor 89, is varying in accordance with the sawtooth output of transistor 83. The net effect of this arrangement is the determination of where on the sawtooth, the right hand side (84) of the differential pair starts to conduct. Thus, with resistor 88 set at a maximum position, transistor 84 will be "ON" all the time, and with 88 at a minimum position, transistor 84 will be "OFF" all the time. Between these two extremes the output of transistor 84 across resistor 86 will comprise a sawtooth waveform having a pulse width which varies in accordance with the setting of resistor 88.

The output of transistor 84 is delivered via line 90 to the base of transistor 91 which in turn drives transistor 92 through resistor 97. Transistor 92 is utilized in a power Darlington arrangement with power transistors 93, 94 and 95, which are connected in parallel. The output of the power transistors is a pulse width modulated square wave which reaches permanent magnet motor 102 via line 98 and relay 100. (Relay 100 is shown in the forward position.) Diode 104 is a "free wheeling" diode and increases operating efficiency by conducting induced motor currents during "pulse off" intervals, allowing the motor to produce torque during these intervals.

The controller circuit as previously described will be bypassed automatically when high power is desired by the operator. When power is supplied to relay field 105, relay switch 106 will connect the positive side of the battery directly to one side of the motor armature via line 109, while relay switch 107 will complete the armature circuit by providing a direct battery return path via line 110. As will later be explained, the bypass relay is inoperable when the unit is in the reverse mode.

One end of bypass relay field winding 105 is connected directly to positive voltage. The other end of the relay field is connected via resistor 112 and line 113 to the collector junction of Darlington transistors 115 and 116. When this Darlington pair is turned on, current will flow through relay field winding 105 thereby actuating relay switches 106 and 107, and thus bypassing the pulse width modulation control circuit.

Control over the Darlington transistors is accomplished by transistor 114. The base of transistor 114 is connected via resistor 119 to the arm of speed control potentiometer 88. When the wheelchair is running at a low speed, the arm of the speed control potentiometer will be at a positive potential sufficient to bias transistor 114 on. The collector voltage of transistor 114, developed across resistor 120, is directly coupled to the base of Darlington transistor 115 keeping the Darlington pair off, when transistor 114 is on. As vehicle speed is increased the arm of potentiometer 88 becomes less positive, and eventually the base of transistor 114 will be insufficiently biased to maintain that transistor on. When this occurs, the Darlington pair will turn on, thus energizing relay field winding 105. Automatic engagement of the "passing gear" relay will thus occur when the user selects a predetermined high speed.

Relay field winding 105 is a 6-volt device, and accordingly a series resistor 112 is provided. Utilization of this arrangement allows the bypass relay to remain engaged as long as the battery puts out at least 4 volts, so that the wheelchair may continue to function with the bypass system operable until the battery is very nearly completely discharged. If the relay field winding were designed for 12-volt operation, the relay would be inoperable when the battery voltage decreased to around 9 volts.

The direction of travel may be reversed by actuation of reverse switch 120a. Energizing of reversing relay field winding 103 will reverse the polarity of the supply voltage which is delivered to the armature 102 of the drive motor by tripping reversing relay switches 100a and 100b. Collector current from the power transistors which appears on line 98 will then enter the opposite armature terminal.

In order to energize relay field 103, line 132 must be effectively grounded. With switch 120 in the "reverse" (R) position, line 132 will be grounded via transistor 124 if that transistor is on. However, lockout circuitry will prevent engagement of reverse whenever voltage is being applied to the motor. Thus when the unit is on and traveling in the forward direction, line 134 will be positive whether or not the control bypass relay has been engaged. Therefore, transistor 125 will be turned on via line 134, diode 128 and resistor 129. With transistor 125 on, the voltage across resistor 130 will drop, causing transistor 124 to remain off. As a result, reverse cannot be engaged while the motor is running.

If no voltage is being supplied to the motor, diode 128 and transistor 125 will be "OFF" and transistor 124 will be "ON." In this case, actuation of reversing switch 120 will cause the unit to engage reverse, as switches 100a and 100b will be actuated. When this occurs, line 136 will become positive, and transistor 123 will be turned on via diode 126 and resistor 127. Transistor 123 provides a latching circuit which effectively grounds line 132 when reverse has been engaged, and "bypasses" switch 120. Therefore, when the unit is being operated in reverse, forward gear cannot be engaged as long as the motor is energized. Thus "jackrabbit" starts are avoided.

When operating in reverse, safer smaller speeds are ordinarily desired so the control circuit bypass relay is prevented from engaging. Bypass relay field 105 is normally actuated by Darlington transistors 115 and 116, as previously described. However, when reverse gear is engaged, transistor 124 is on, so that current will flow from the base of transistor 115 through line 138, diode 118 and transistor 124. When diode 118 is on, the Darlington pair comprised of transistors 115 and 116 will be prevented from operating and the control circuit override is inoperable. The override circuitry can only operate in the forward direction, and when it is engaged, the reverse gear cannot be actuated because line 109 would then make line 134 positive, as previously discussed.

Transformer 140 provides power for the unit's self-contained battery charging circuit. The transformer primary is suitable for ordinary household current and the secondary supplies approximately 16 volts in the preferred embodiment. Diodes 141, 142, 143 and 144 provide full wave rectification. Light bulb 145 is rated at 12 volts at 100 watts in the preferred embodiment, so that a taper charge will be provided with the bulb (145) acting as a current limiter. A smaller bulb 146, in parallel with bulb 145, will similarly light up when the battery is charging and will gradually become dim as the battery recovers, thereby indicating to the user when the battery is recharged. This bulb is mounted in a receptacle 31 (FIG. 2) which is exteriorly visible to the operator.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. An electrically powered motor-driven wheelchair, said wheelchair comprising:

a battery for the production of DC power;

a motor;

motor control means operably connected to said battery for generating a plurality of DC pulses, the pulses being applied to said motor to energize same;

means for reversing the electrical connection of said motor to said control means to thereby reverse the direction of travel of said wheelchair;

means for bypassing said motor control means, said bypassing means permitting operation of said motor under preselected low voltage battery conditions; and bypass defeat means for preventing the engagement of said bypass means whenever said motor connection reversing means is engaged, said bypass defeat means thereby preventing said motor control means from being bypassed when said wheelchair is operating in reverse.

2. The combination as in claim 1 including a reverse mode defeat means for preventing the engagement of said motor connection reversing means whenever said motor is energized.

3. The combination as in claim 1 including a reverse mode defeat means for preventing the engagement of said motor connection reversing means whenever said motor is energized.

4. The combination as in claim 1 wherein said motor control means includes means to vary the width of said pulses.

5. The combination as in claim 2 wherein said motor control means includes means to vary the width of said pulses.

6. The combination as in claim 3 wherein said motor control means includes means to vary the width of said pulses.

* * * * *